March 10, 1970     MICHIAKI ITO     3,499,713
LASER COMMUNICATION DEVICE
Filed June 13, 1966

INVENTOR
M. ITO
BY
     Hopgood & Calimafde
ATTORNEYS

_United States Patent Office_

3,499,713
Patented Mar. 10, 1970

3,499,713
LASER COMMUNICATION DEVICE
Michiaki Ito, Tokyo, Japan, assignor to Nippon Electric Company Limited, Tokyo, Japan, a corporation of Japan
Filed June 13, 1966, Ser. No. 557,050
Claims priority, application Japan, July 8, 1965, 40/41,013
Int. Cl. G01f *11/26;* G01c *1/00;* G02f *23/02*
U.S. Cl. 356—138                    3 Claims

ABSTRACT OF THE DISCLOSURE

A laser communication device including a transmitter firmly fixed in position, and a collimator, typically an inverted Galilean telescope, pivotally mounted to assure arbitrary adjustment of beam direction. Two mirrors are provided optically disposed between the transmitter and collimator for aligning the laser beam. One mirror is located on the axis of the laser, and the other along the axis of the collimator. Both mirrors are pivotally mounted for attitude adjustment.

---

Figure 1:
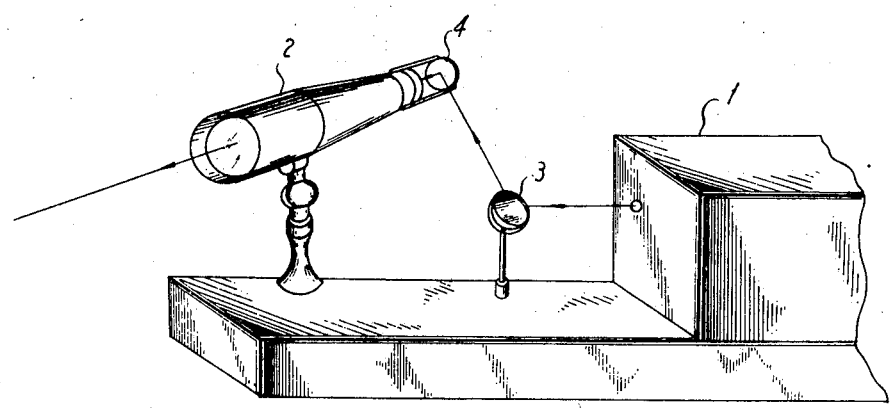

This invention relates generally to communication apparatus in which the output of a laser serves as the carrier, and in particular, the invention relates to an arrangement for precisely directing the laser beam to the point of reception.

In conventional optical communication devices, the light source utilized is either incandescent or from a discharge tube, neither of which approach the ideal point source, and consequently, the angular divergence from the source is of the order of 10 milliradians or greater, regardless of the optical system used to collimate the rays. Accordingly, it is possible in communication devices of this kind to aim the device with the use of a small sighting telescope having its axis parallel with that of the collimating system.

Where, however, a laser is used as a light source, the angular divergence of the beam may be reduced to the order of several microradians, or less than one hundredth of that of a conventional source, without resorting to an expensive optical condenser system. Consequently, the laser output beam is imperceptible at points remote from the precise point to which the laser is directed. Thus, a degree of precision not heretofore required now becomes necessary in aiming the beam. In other words, the mere use of a sighting telescope is insufficient to achieve the precise alignment necessitated by the laser. Further, the small beam divergence requires increased stability against mechanical shock to, or vibration of, the relatively large communication laser and accompanying modulator, which would possibly result in misalignment of the optical axes concerned in converging the rays.

Accordingly, it is the object of this invention to provide a laser communication device with an optical collimating system for precisely adjusting the direction of the output laser beam, and to provide a system which firmly supports the laser device against misalignment by mechanical vibration or shock.

Briefly, the invention is predicated upon a laser source, and Galilean telescope or another similar collimating or condensing system, the latter of which has an adjustable optical axis non-coincident with the direction of the laser beam. The two are optically coupled by means of a first reflector disposed in proximity to the laser device and coaxial therewith, and a second reflector co-supported with the collimating system along its optical axis.

With this arrangement, it is not only possible to obtain the precise alignment by merely adjusting the directions of the condenser system and first and second reflectors, maintaining the massive laser source without movement, but it is also possible to greatly improve the mechanical stability of the device as a whole.

Figure 2:
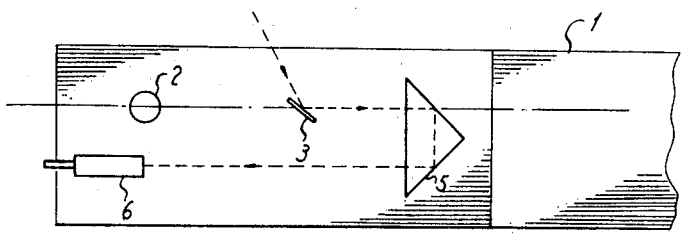

The above mentioned and other features and objects of this invention and the manner of attaining them will become more apparent and the invention itself will best be understood by reference to the following description of embodiments of the invention taken in conjunction with the accompanying drawings wherein:

FIG. 1 is a perspective illustration of a communication device embodying the invention; and FIG. 2 is a plan view of an alternative embodiment to that shown in FIG. 1.

Referring now to the figures, and in particular to FIG. 1, the laser communication device according to the invention comprises: the laser transmitter 1 comprising a laser source and modulator; a collimator system 2 comprising a Galilean telescope; a first reflector 3 mounted on the same support that bears the laser device and having its reflecting surface towards said device and in intercepting relation with the laser axis; and a second reflector 4 supported on the condenser system 2 with its reflecting surface directed towards the condenser and in intercepting relation with its optical axis. Since both reflectors 3 and 4 are effectively gimbaled on their respective platforms, it is possible to adjust each in an infinite variety of attitudes restricted only by the functional requisites of the system. The ball pivot mounting of the condenser system 2 also permits an infinite variety of attitudes.

In use, the optical axis of the condenser system 2 is adjusted until the remote point of reception is visible from the second reflector side of the condenser; in other words, the collimator is adjusted until the point of reception is imaged at the end which will first receive the laser light. When this has been accomplished, the direction of the first reflector 3 is adjusted until the light emitted from the laser falls on the reflecting surface of the second reflector 4, and the direction of the second reflector is adjusted until the intensity of the laser light passing through the condenser 2 is maximized. Following this procedure, it is possible to precisely relate the optical axes of the laser and condenser.

With the foregoing embodiment, the condenser is aligned by directly viewing through one end. It is also possible to effect the same result indirectly. FIG. 2 illustrates an embodiment which includes, in addition to those elements depicted in FIG. 1, a prism 5 and finder-telescope 6. The prism is a conventional rectangular prism, whose cross-section is a right-angled isosceles triangle. It is disposed so that the hypotenuse is substantially perpendicular to the output of the laser. The finder telescope 6 is positioned parallel to the direction of the output light. Consequently, the image reflected by the first reflector 3 and entering the prism 5 is subjected twice to total reflection and is observed by the telescope 6. To aim the condenser 2, the prism 5 is first put into the exact location mentioned above and the condenser and the first and second reflectors are adjusted so that the point of reception is imaged, and thereby observed, by the telescope 6. After these positions have been precisely determined, the prism 5 is removed from the path of the output light of the laser and the device is ready to be set into operation.

Alternatively, the prism 5 can be eliminated by substituting for the reflector 3, a reflector having a multilayer dielectric reflecting film (detailed in "Physical Review Letters" by A. Javan et al., vol. 6, No. 3, February 1961, p. 108) and arranging the telescope 6 behind this reflector and on a line extending from the path of the light incident thereon from the reflector 4. An additional reflector would be disposed perpendicularly to the optical axis of the laser and outside of the reflector 3. With this arrangement, use is made of the fact that the reflection of the multilayer dielectric reflecting film is almost 100% for the wavelength of the laser light, but the same film is semitransparent for some part of the visible light spectrum. Further, even in the spectrum of the laser light, the reflection is not total and .01 to .1% is transmitted through. Thus one may, by looking through the telescope 6, observe the image of the point of reception as well as the laser light transmitted through the multilayer reflector after emerging from the laser, reflected by the additional reflector, and reflected again by the lower surface of the multilayer reflector.

When the attitudes of the collimating system 2, the reflector 4, and the multilayer reflector are adjusted so that the point of reception is visible coincidentally with the laser light, the correct alignment has been achieved.

While the principles of the invention have been described in connection with specific apparatus, it is to be clearly understood that this description is made only by way of example and not as a limitation to the scope of the invention as set forth in the objects thereof and in the accompanying claims. For example, the first and second reflectors, illustrated in the first embodiment as plane mirrors, may also be spherical provided that aberrations are taken into consideration. Moreover, the collimating system which has been described as comprising a Galilean telescope, may be replaced with any other optical system, for example, a reflecting type telescope which comprises a concave mirror and a small mirror disposed near the focus of the concave mirror so as to convert the laser light incident thereon to parallel rays.

I claim:

1. A laser communication device comprising a laser transmitter; an optical system for condensing the laser beam emanating from said transmitter; a first reflector, optically disposed between said transmitter and condensing system in intersecting relation with said laser beam; means for attitude-adjustably mounting said first reflector; means for attitude-adjustably supporting said optical system; a second reflector optically disposed between said transmitter and condensing system and supported along the axis of said optical system; and, means for attitude-adjustably mounting said second reflector.

2. The communication device claimed in claim 1, where said first and second reflectors are planar and are gimbaled upon their respective supports.

3. The communication device claimed in claim 1 further comprising a right angle isosceles prism removably mounted with its hypotenuse perpendicular to and in intercepting relation with the axis of said laser beam, and a sighting telescope directed at said prism with its optical axis parallel to the axis of said laser beam.

References Cited

UNITED STATES PATENTS

| | | | |
|---|---|---|---|
| 2,302,952 | 11/1942 | Pfeifer | 350—304 |
| 2,506,764 | 5/1950 | Bach | 88—1.5 |
| 3,224,330 | 12/1965 | Kompfner | 350—231 |
| 3,237,518 | 3/1966 | Krajowsky et al. | 350—299 |
| 3,315,177 | 4/1967 | Benson | 331—94.5 |

OTHER REFERENCES

Michiaki Ito, Transmitter for Coherent Light Communication System, IEEE, International Convention Record, vol. 12, No. 2, pp. 59–66, 1964.

RONALD L. WIBERT, Primary Examiner

J. ROTHENBERG, Assistant Examiner

U.S. Cl. X.R.

250—199; 331—94.5; 350—25